(12) United States Patent
Tang

(10) Patent No.: US 11,501,790 B2
(45) Date of Patent: Nov. 15, 2022

(54) AUDIOVISUAL COMMUNICATION SYSTEM AND CONTROL METHOD THEREOF

(71) Applicant: Compal Electronics, Inc., Taipei (TW)

(72) Inventor: Dao-Wen Tang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/207,419

(22) Filed: Mar. 19, 2021

(65) Prior Publication Data

US 2022/0208203 A1    Jun. 30, 2022

(30) Foreign Application Priority Data

Dec. 29, 2020    (TW) .................................. 109146725

(51) Int. Cl.
*G10L 21/0208*    (2013.01)
*H04S 7/00*    (2006.01)
(Continued)

(52) U.S. Cl.
CPC .......... *G10L 21/0208* (2013.01); *H04R 3/005* (2013.01); *H04S 7/303* (2013.01);
(Continued)

(58) Field of Classification Search
CPC ......... G10L 15/20; G10L 25/84; G10L 15/22; G10L 21/0232; G10L 19/008;
(Continued)

(56) References Cited

U.S. PATENT DOCUMENTS 6,469,732 B1 * 10/2002 Chang ...................... H04N 7/15
    348/E7.083
6,731,334 B1    5/2004 Maeng et al.
(Continued)

FOREIGN PATENT DOCUMENTS

CN    108200515 A    6/2018
JP    2009225379 A  * 10/2009
(Continued)

*Primary Examiner* — Matthew A Eason
*Assistant Examiner* — Kuassi A Ganmavo
(74) *Attorney, Agent, or Firm* — Kirton McConkie; Evan R. Witt

(57) ABSTRACT

An audiovisual communication system includes a plurality of environment sound sources, a microphone array, an image processing device, an audio processing device and a denoise processing device. Each of the plurality of environment sound sources has an environment sound. A plurality of microphones of the microphone array receive the plurality of environment sounds and output a plurality of receiving audio signals according to the plurality of environment sounds respectively. The image processing device obtains an image including the plurality of environment sound sources and selects one of the plurality of environment sound sources in the image as a target sound source according to a selection command. The image processing device calculates a relative position between the target sound source and the microphone array according to a first coordinate. The audio processing device receives the plurality of receiving audio signals and calculates a target audio signal.

10 Claims, 7 Drawing Sheets

(51) Int. Cl.
*H04R 3/00* (2006.01)
*H04S 5/00* (2006.01)
*G10L 15/20* (2006.01)
*H04R 1/40* (2006.01)
*G10L 21/0232* (2013.01)
*G10L 25/84* (2013.01)
*H04N 7/15* (2006.01)
*G10L 19/008* (2013.01)

(52) U.S. Cl.
CPC ............ *G10L 15/20* (2013.01); *G10L 19/008* (2013.01); *G10L 21/0232* (2013.01); *G10L 25/84* (2013.01); *H04N 7/15* (2013.01); *H04R 1/406* (2013.01); *H04R 2420/07* (2013.01); *H04S 5/00* (2013.01); *H04S 7/30* (2013.01); *H04S 2400/01* (2013.01)

(58) Field of Classification Search
CPC .... G10L 21/0208; G06K 9/6217; H04N 7/15; H04R 1/406; H04R 3/005; H04R 2420/07; H04S 5/00; H04S 7/30; H04S 2400/01; H04S 7/303
See application file for complete search history.

(56) References Cited

U.S. PATENT DOCUMENTS

| | | | |
|---|---|---|---|
| 9,621,795 B1* | 4/2017 | Whyte | H04R 3/005 |
| 9,753,119 B1* | 9/2017 | Velusamy | G01S 17/894 |
| 9,881,634 B1* | 1/2018 | Corey | G10L 15/02 |
| 9,883,143 B2 | 1/2018 | Tangeland et al. | |
| 10,659,731 B2 | 5/2020 | Harrison et al. | |
| 2003/0177007 A1* | 9/2003 | Kanazawa | G10L 15/20 |
| | | | 704/233 |
| 2008/0260167 A1* | 10/2008 | Kim | G01H 3/125 |
| | | | 345/440.1 |
| 2010/0254543 A1* | 10/2010 | Kjolerbakken | H04R 1/406 |
| | | | 345/173 |
| 2012/0155703 A1* | 6/2012 | Hernandez-Abrego | |
| | | | A63F 13/213 |
| | | | 382/103 |
| 2012/0163625 A1* | 6/2012 | Siotis | H04R 3/005 |
| | | | 381/92 |
| 2014/0337016 A1* | 11/2014 | Herbig | G10L 25/27 |
| | | | 704/201 |
| 2019/0174068 A1* | 6/2019 | Wang | H04N 7/147 |

FOREIGN PATENT DOCUMENTS

| | | | | |
|---|---|---|---|---|
| TW | I473009 B | 2/2015 | | |
| TW | I593294 B | 7/2017 | | |
| TW | M591655 U | 3/2020 | | |
| TW | M594202 U | 4/2020 | | |
| TW | I695632 B | 6/2020 | | |
| TW | I701609 B | 8/2020 | | |
| WO | WO-2011063616 A1 * | 6/2011 | ............ | G06T 7/204 |

* cited by examiner

AUDIOVISUAL COMMUNICATION SYSTEM AND CONTROL METHOD THEREOF

CROSS-REFERENCE TO RELATED APPLICATION

This application claims priority to Taiwan Patent Application No. 109146725, filed on Dec. 29, 2020, the entire content of which is incorporated herein by reference for all purposes.

FIELD OF THE INVENTION

The present disclosure relates to an audiovisual communication system and control method thereof, and more particularly to an audiovisual communication system and a control method thereof combining microphone array technology and image processing technology.

BACKGROUND OF THE INVENTION

With the development of communication networks, instant communication has become increasingly mature and is used in remote meetings and telemedicine to overcome distance barriers. For example, remote meetings have gradually replaced conventional face-to-face meetings. Through the real-time voice or video communication, the meeting place for users is no longer restricted.

In the process of communication, the quality of the voice call is a very important part. One of the main factors affecting the quality of the voice call is the clarity of the sound source, and the other is the ability of the audiovisual communication system handling the environmental noise, that is, the ability of noise canceling. Conventional audiovisual communication systems often utilize directional microphones to receive the signals of sound sources from various directions, and enhance the signal-to-noise ratio (SNR) of the received sound source with the largest volume. However, the conventional directional microphones cannot determine the relative position between each sound source and the microphones. Therefore, if the volume of the noise sound is the highest, the target sound source cannot be accurately determined.

Therefore, there is a need of providing an audiovisual communication system and a control method thereof to obviate the drawbacks encountered from the prior arts.

SUMMARY OF THE INVENTION

It is an object of the present disclosure to provide an audiovisual communication system and a control method thereof combining microphone array technology and image processing technology. The image processing device obtains an image including all the sound sources, and selects one sound source in the image as a target sound source according to a selection command. The image processing device calculates the relative position between the target sound source and the microphone array. The audio processing device performs audio processing to the audio received by the microphone array according to the relative position. Therefore, the target sound source and the noise are accurately identified, the clarity of the target sound source is improved, and the volume of the noise is reduced, thereby ensuring the communication quality.

In accordance with an aspect of the present disclosure, there is provided an audiovisual communication system. The audiovisual communication system includes a plurality of environment sound sources, a microphone array, an image processing device, an audio processing device and a denoise processing device. Each of the plurality of environment sound sources has an environment sound. The microphone array includes a plurality of microphones, and the plurality of microphones receive the plurality of environment sounds and output a plurality of receiving audio signals according to the plurality of environment sounds respectively. The image processing device obtains an image including the plurality of environment sound sources and selects one of the plurality of environment sound sources in the image as a target sound source according to a selection command. The image processing device calculates a relative position between the target sound source and the microphone array according to a first coordinate between the microphone array and the image processing device. The audio processing device is connected to the image processing device and the microphone array. The audio processing device receives the plurality of receiving audio signals and the relative position and calculates a target audio signal according to the plurality of receiving audio signals and the relative position. The denoise processing device is connected to the audio processing device and is configured for receiving the target audio signal and outputting an output sound.

In accordance with an aspect of the present disclosure, there is provided a control method of an audiovisual communication control method. The control method including steps of: (a) utilizing a plurality of microphones of a microphone array to receive a plurality of environment sound and to output a plurality of receiving audio signals according to the plurality of environment sound respectively; (b) providing a first coordinate between an image processing device and the microphone array; (c) utilizing the image processing device to obtain an image including a plurality of environmental sound sources; (d) utilizing a selection command to select one of the plurality of environment sound sources as a target sound source; (e) utilizing the image processing device to calculate a relative position between the target sound source and the microphone array according to a first coordinate; (f) utilizing an audio processing device to receive the plurality of receiving audio signals and the relative position and to calculate a target audio signal according to the plurality of receiving audio signals and the relative position; and (g) utilizing a denoise processing device to receive the target audio signal and to output an output sound.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
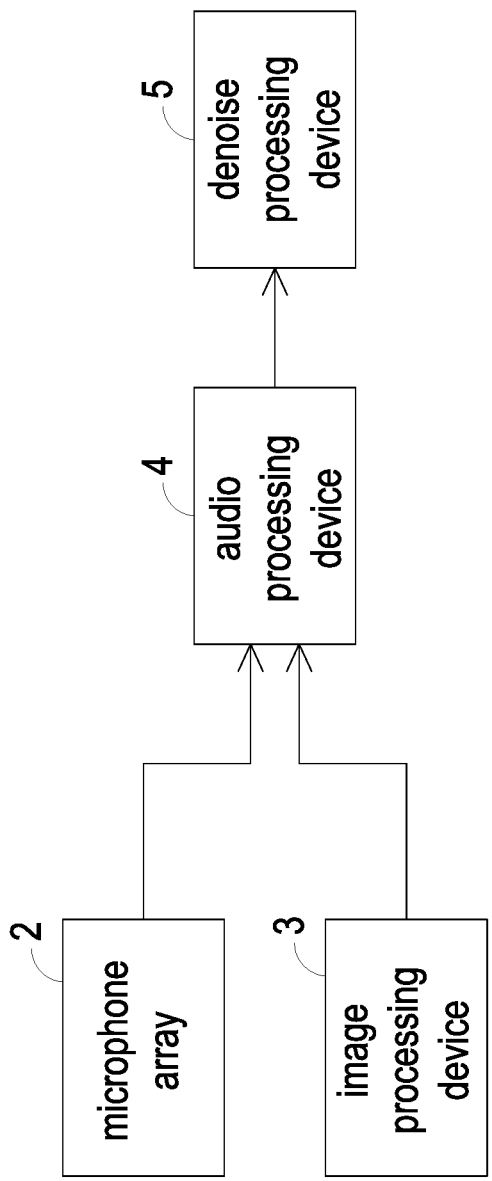
FIG. 1 is a schematic circuit diagram illustrating an audiovisual communication system according to an embodiment of the present disclosure.
Figure 2:
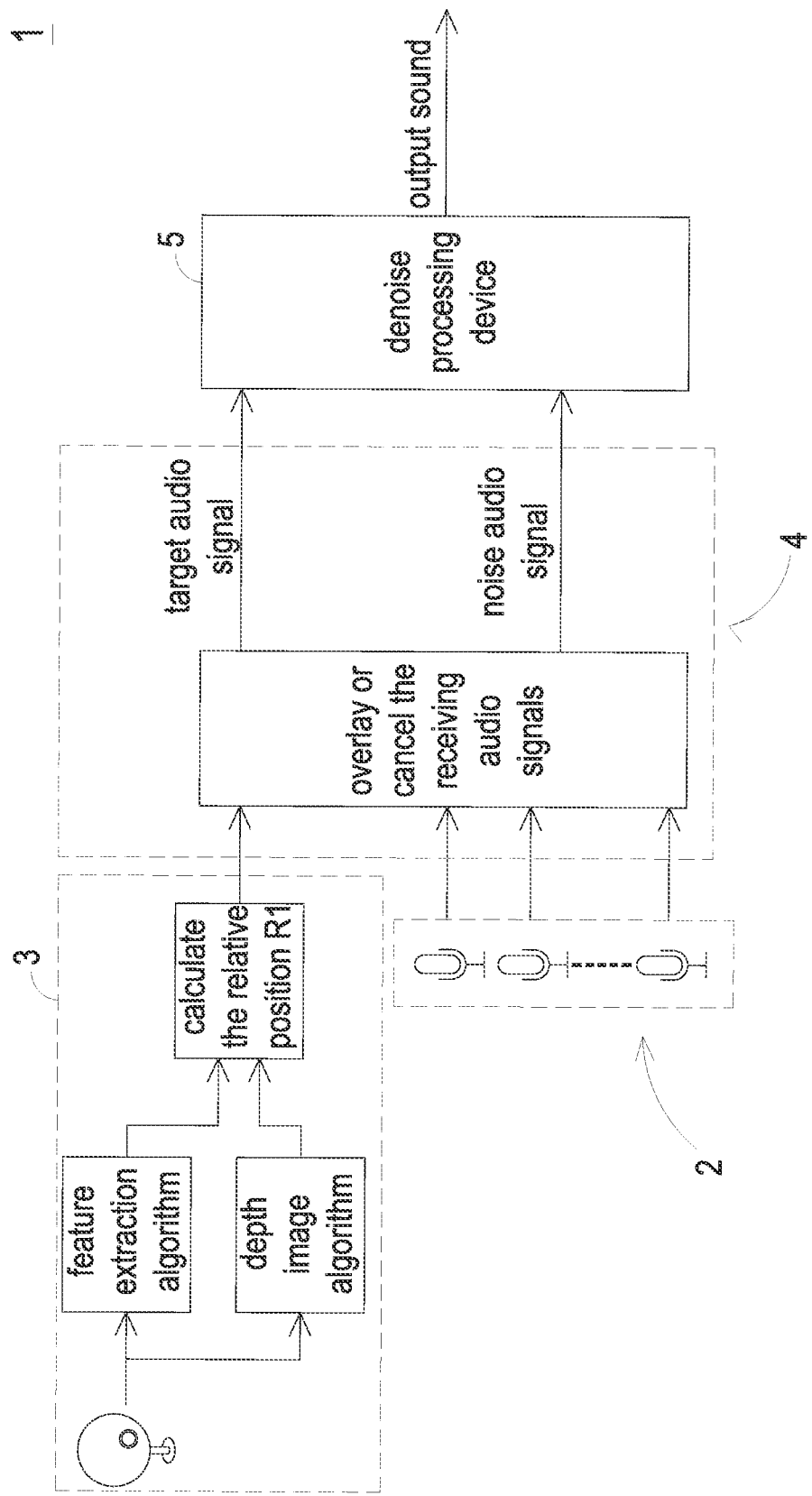
FIG. 2 is a schematic block diagram illustrating the audiovisual communication system according to the embodiment of the present disclosure.
Figure 3:
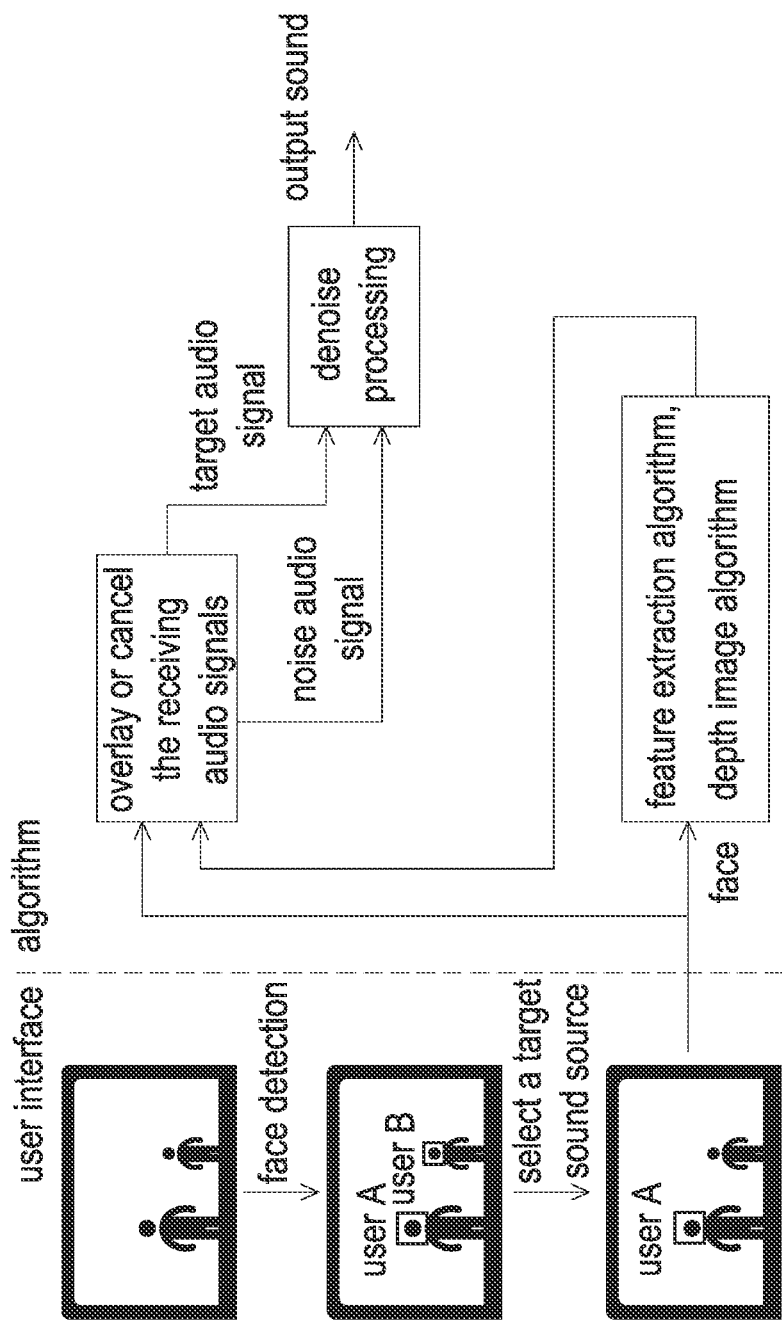
FIG. 3 is a schematic user interface diagram illustrating the audiovisual communication system according to the embodiment of the present disclosure.

FIG. 1 is a schematic circuit diagram illustrating an audiovisual communication system according to an embodiment of the present disclosure. FIG. 2 is a schematic block diagram illustrating the audiovisual communication system according to the embodiment of the present disclosure. FIG. 3 is a schematic user interface diagram illustrating the audiovisual communication system according to the embodiment of the present disclosure. As shown in FIGS. 1, 2, and 3, the audiovisual communication system 1 includes a plurality of environment sound sources (not shown), a microphone array 2, an image processing device 3, an audio processing device 4 and a denoise processing device 5. The microphone array 2 is located at a first coordinate Y1 relative to the audiovisual communication system 1. The first coordinate Y1 is calculated by substituting a reference coordinate Yo of the image processing device 3 into a coordinate transformation matrix formula. For example, as shown in formula (1), the image processing device 3 utilizes the coordinate transformation matrix R to convert the reference coordinate Yo of the image processing device 3 to the first coordinate Y1 of the microphone array 2. In formula (1), B is the coordinate translation matrix.

$$Y1 = RYo + B \quad (1)$$

Each of the plurality of environment sound sources has an environment sound. The environment sound sources can be, for example, but not limited to, human voice or non-human voice noise in the environment. The microphone array 2 includes a plurality of microphones, and the plurality of microphones receive the plurality of environment sounds and output a plurality of receiving audio signals according to the plurality of environment sounds respectively. The image processing device 3 obtains an image including the plurality of environment sound sources. In an embodiment, the image processing device 3 includes video recording device such as a camera or video equipment and utilizes the video recording device to obtain images. The image processing device 3 receives the selection command L and selects one of the plurality of environment sound sources as a target sound source according to the selection command L. The selection command L is a command given by a user to the audiovisual communication system 1. In this embodiment, the user can select one of the plurality of environment sound sources in the image as the target sound source by inputting the selection command L to the image processing device 3. For example, as shown in FIG. 3, the audiovisual communication system 1 includes a user interface. The image processing device 3 receives the selection command L and selects one of the plurality of the environment sound sources as the target sound source according to the selection command L. The image processing device 3 calculates the relative position R1 between the selected target sound source and the microphone array 2 according to the first coordinate Y1. The relative position R1 includes a depth and an angle between the target sound source and each microphone in the microphone array 2. In an embodiment, the environment sound source selected by the image processing device 3 according to the selection command L must be a human face. The image processing device 3 includes a feature extraction algorithm. The image processing device 3 utilizes the feature extraction algorithm to perform face detection on all identifiable faces in the image and creates a corresponding label for each face according to the result of feature extraction, so as to distinguish different faces. The image processing device 3 selects one of the labels corresponding to different faces as the target sound source according to the selection command L.

Figure 4:
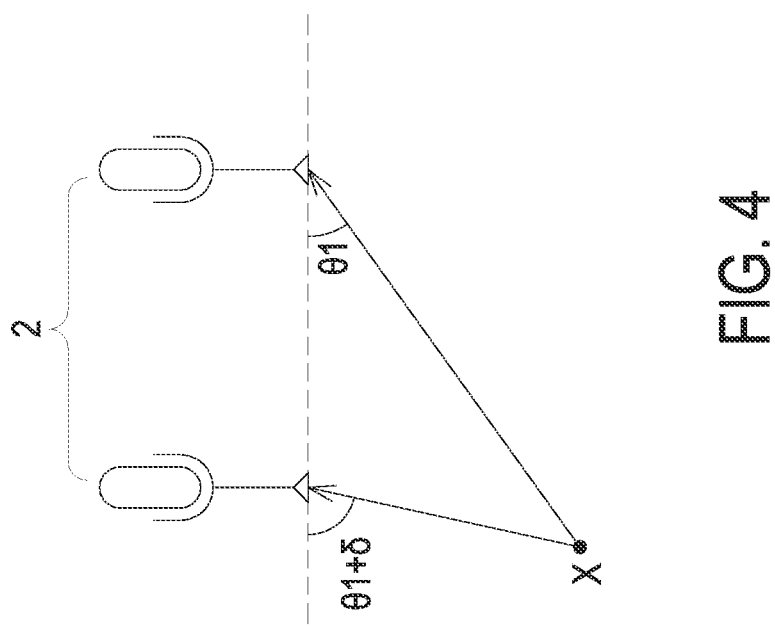
FIG. 4 is a schematic view illustrating the position relationships in the audiovisual communication system according to the embodiment of the present disclosure.

In an embodiment, the image processing device 3 includes a depth image algorithm. The depth image algorithm performs depth image calculation on the plurality of environment sound sources in the image to obtain a target depth D between the target sound source and the image processing device 3. Then, the image processing device 3 utilizes the first coordinates Y1 between the image processing device 3 and the microphone array 2 and the target depth D to correct and obtain the depth and angle between the target sound source and each microphone in the microphone array 2. In an embodiment, the relative position YM among all the microphones in the microphone array 2 is known. Therefore, the relative position between the image processing device 3 and each microphone can be obtained through the first coordinate Y1 between the image processing device 3 and the microphone array 2. For example, as shown in FIG. 4, the microphone array 2 of the audiovisual communication system 1 includes two microphones. The image processing device 3 calculates the angle between the target sound source X and a first microphone as θ1 and calculates the angle between the target source X and a second microphone as θ1+δ according to the known first coordinate Y1 and the selected target sound source X. Thereby, the relative position R1 between the target sound source X and the microphone array is obtained.

The audio processing device 4 is connected to the image processing device 3 and the microphone array 2. The audio processing device 4 receives the plurality of receiving audio signals and the relative position R1, and calculates the target audio signal according to the plurality of receiving audio signals and the relative position R1. The audiovisual communication system of the present disclosure selects the target sound source according to the selection command, and calculates the relative position R1 between the target sound source and the microphone array 2. Further, the audiovisual communication system utilizes the plurality of the receiving audio signal and the relative position R1 to output an output sound. Thereby, the target sound source and the noise are accurately identified. The denoise processing device 5 is connected to the audio processing device 4 and is configured for receiving the target audio signal and outputting the output sound. The denoise processing device 5 performs denoise processing to the target audio signal and outputs the output sound.

In an embodiment, the audio processing device 4 overlays or cancels the plurality of receiving audio signals by each other according to the plurality of depths and angles, and the audio processing device 4 outputs a target audio signal. Since the microphones in the microphone array 2 are arranged at different positions, the receiving audio signals outputted by the microphones are also different. Through overlaying or canceling the plurality of receiving audio signals from different microphones by each other according to the plurality of depths and angles, the clarity of the target audio signal can be enhanced. Thereby, in addition to accurately identifying the target sound source and the noise, the clarity of the target sound source is improved, and the volume of surrounding noise is reduced. Consequently, the communication quality can be ensured.

In an embodiment, the audio processing device 4 not only outputs the target audio signal but also outputs the noise audio signal according to the plurality of receiving audio signals. In particular, the audio processing device 4 receives the plurality of receiving audio signals and the relative position R1, and calculates the target audio signal and the noise audio signal according to the plurality of receiving audio signals and the relative position R1. The denoise processing device 5 receives the target audio signal and the noise audio signal, and outputs the output sound according to the target audio signal and the noise audio signal. By calculating the target audio signal and the noise audio signal simultaneously, the denoise device 5 utilizes the noise audio signal to further filter the residual noise in the target audio signal and outputs the output sound accordingly. Therefore, the clarity of the target audio source is further improved, and the volume of the surrounding noise is reduced.

In an embodiment, the microphone array 2 receives the plurality of environment sound sources from different directions. The volume intensity of the environment sound source is shown in the image. The image processing device 3 receives the selection command L and selects one of the plurality of environment sound sources as the target sound source according to the selection command L. Moreover, the image processing device 3 regards the environment sound source with the largest volume among the plurality of environment sound sources except for the target sound source as the high-intensity noise. Consequently, by utilizing the high-intensity noise as the noise audio, the clarity of the target sound source is further enhanced, and the volume of surrounding noise is reduced.

In an embodiment, the target sound source, selected by the selection command L, is a moving object and will not be fixed at the same position. That is, the relative position R1 will change by the target sound source moving. When the relative position R1 changes by the target sound source moving, the user can input a tracking command T into the audiovisual communication system 1 so as to track the target sound source. The image processing device 3 receives the tracking command T and tracks the movement of the target sound source according to the tracking command T. In addition, the image processing device 3 can utilize the feature extraction algorithm included therein to track the label corresponding to the target sound source in the feature extraction result. When the target sound source moves, the image processing device 3 continuously obtains the images including the target sound source, and continuously tracks the movement of the target sound source based on the label corresponding to the target sound source. The image processing device 3 continuously updates the relative position R1 between the target sound source and the microphone array 2. The audio processing device 4 receives the plurality of receiving audio signals and the updated relative position R1 and calculates the target audio signal accordingly, and the denoise processing device 5 receives the target audio signal and outputs the output audio. By tracking the movement of the target sound source, the audiovisual communication system 1 can continuously update the relative position R1, and then utilizes the constantly updated relative position R1 to output the output sound. Accordingly, the communication quality can be ensured even when the target sound source moves constantly. In an embodiment, even if the target sound source leaves the range of the image and then enters the range again, the image processing device 3 can still utilize the label corresponding to the target sound source to continuously track the target sound source when the target sound source enters the range of the image again.

In an embodiment, the audiovisual communication system 1 further includes a voice recognition device 6 connected to the denoise processing device 5. The voice recognition device 6 is configured for receiving the output sound and outputting a plurality of word strings in real time according to the output sound. By outputting the word strings in real-time, the present disclosure can directly record and output the text content, so as to keep meeting records or serve as real-time translation.

In an embodiment, the first coordinated Y1 between the image processing device 3 and the microphone array 2 is not fixed, that is, the first coordinate Y1 can be a variable. For example, the image processing device 3 and the microphone array 2 are an independent video recording device and independent microphones respectively, and the positions of the video recording device and microphones can be changed individually. The user can input the first coordinate Y1 of the video recording device and the microphone array into the audiovisual communication system 1 after the positions of the video recording device and the microphone are determined. In an embodiment, the first coordinate Y1 between the image processing device 3 and the microphone array 2 is a preset value, that is, the first coordinate Y1 between the image processing device 3 and the microphone array 2 does not change. For example, the audiovisual communication system 1 is integrated into a specific device, such as a notebook computer, a smart TV, a tablet, or a smart speaker with a screen, but not limited thereto. The image processing device 3 is a video camera of a notebook computer, the microphone array 2 is the microphones of the notebook computer, and thus the first coordinate Y1 is fixed.

Figure 5:
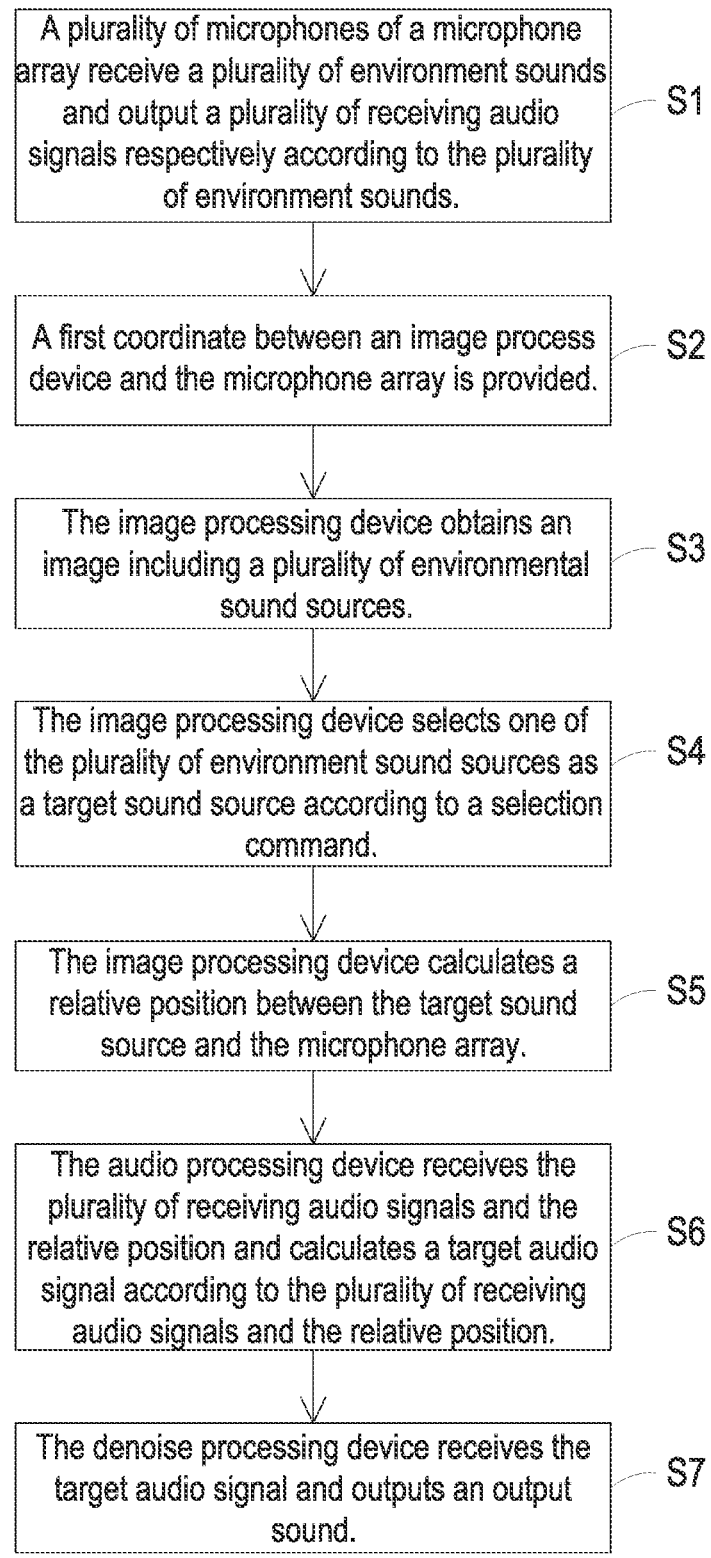
FIG. 5 is a flow chart illustrating a control method of an audiovisual communication system according to an embodiment of the present disclosure.

FIG. 5 is a flow chart illustrating a control method of an audiovisual communication system according to an embodiment of the present disclosure. The control method of an audiovisual communication system of the present disclosure is applicable for the audiovisual communication system 1 stated above. As shown in FIG. 5, the control method of an audiovisual communication system includes steps S1, S2, S3, S4, S5, S6 and S7. In step S1, a plurality of microphones of a microphone array 2 receive a plurality of environment sounds and output a plurality of receiving audio signals respectively according to the plurality of environment sounds. In step S2, a first coordinate Y1 between an image processing device 3 and the microphone array 2 is provided. In step S3, the image processing device 3 obtains an image including a plurality of environmental sound sources. In step S4, the image processing device 3 selects one of the plurality of environment sound sources as a target sound source according to a selection command L. In step S5, the image processing device 3 calculates a relative position R1 between the target sound source and the microphone array 2 according to the first coordinate Y1. In step S6, the audio processing device 4 receives the plurality of receiving audio signals and the relative position R1 and calculates a target audio signal according to the plurality of receiving audio signals and the relative position R1. In step S7, the denoise processing device 5 receives the target audio signal and outputs an output sound.

Figure 6:
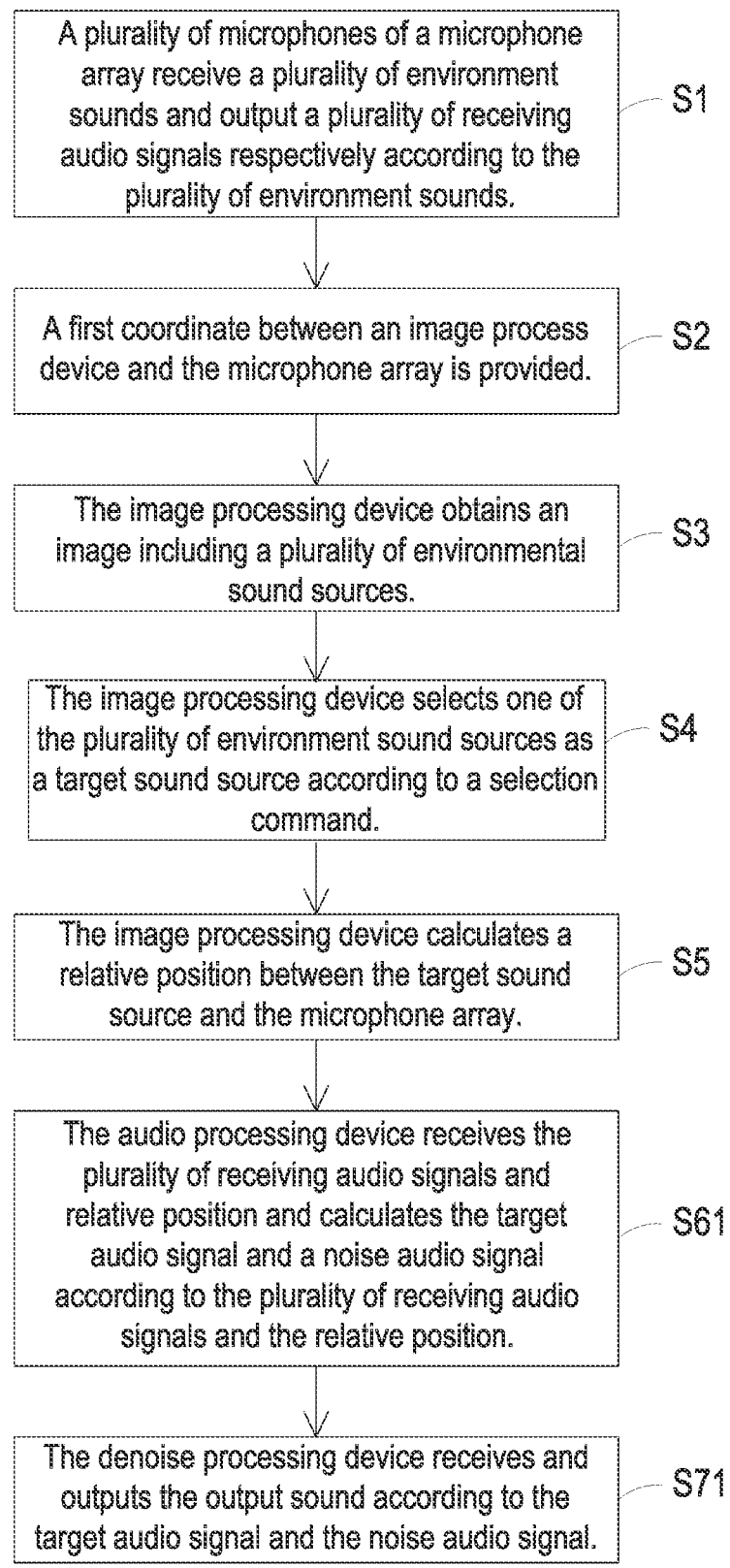
FIG. 6 is a flow chart illustrating a control method of an audiovisual communication system according to another embodiment of the present disclosure.

In an embodiment, as shown in FIG. 6, the step S6 further includes step S61, and the step S7 further includes step S71. In step S61, the audio processing device 4 receives the plurality of receiving audio signals and the relative position R1 and calculates the target audio signal and a noise audio signal according to the plurality of receiving audio signals and the relative position R1. In step S71, the denoise processing device 5 receives the target audio signal and the noise audio signal and outputs the output sound according to the target audio signal and the noise audio signal.

Figure 7:
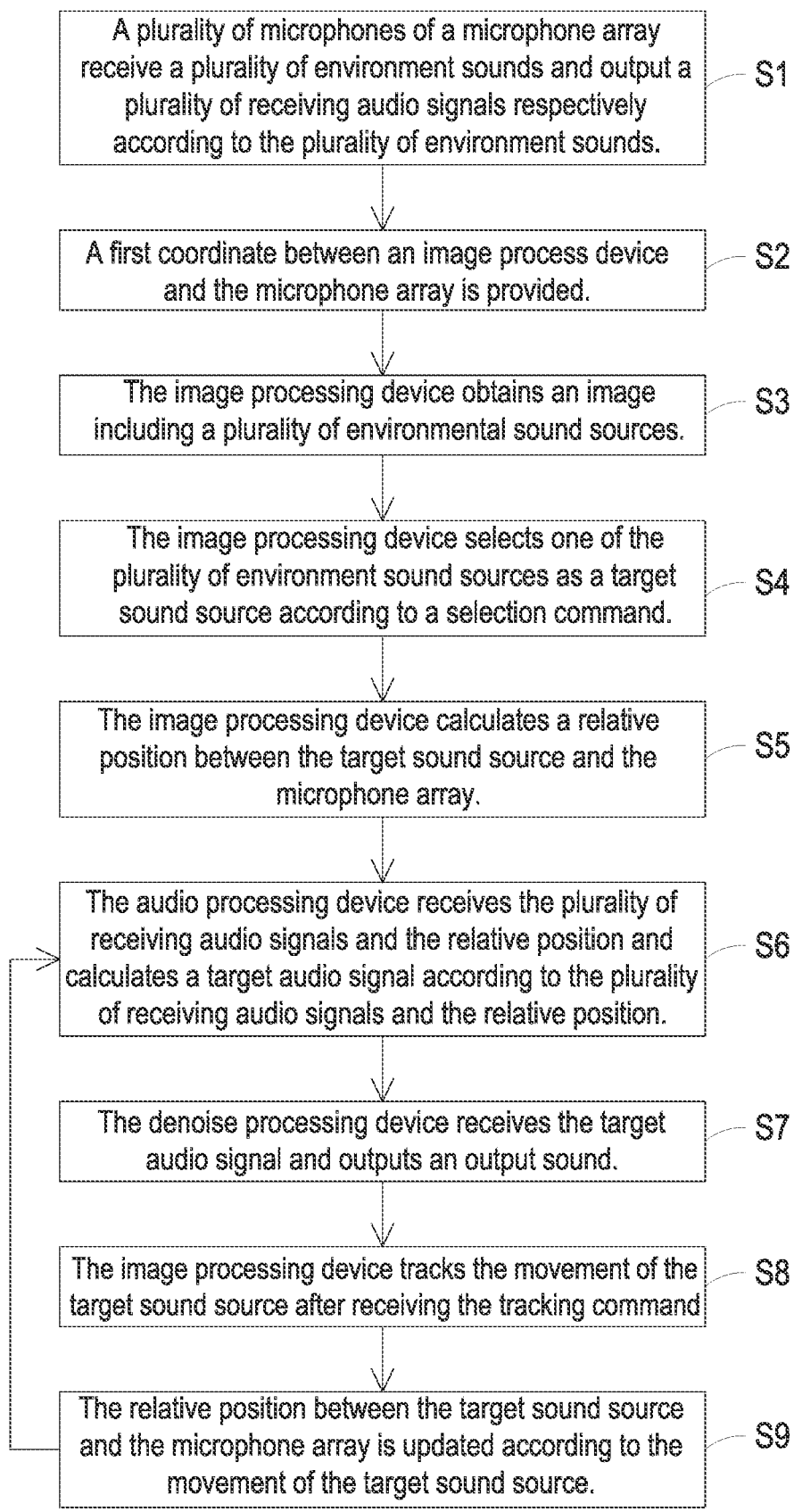
FIG. 7 is a flow chart illustrating a control method of an audiovisual communication system according to another embodiment of the present disclosure.

In an embodiment, as shown in FIG. 7, the control method further includes steps S8 and S9. In step S8, the image processing device 3 tracks the movement of the target sound source when receiving the tracking command T. In step S9, the relative position R1 between the target sound source and the microphone array 2 is continuously updated according to the movement of the target sound source, and step S6 is performed again after performing step S9.

From the above descriptions, the present disclosure provides an audiovisual communication system and a control method thereof combining microphone array technology and image processing technology. The image processing device 3 obtains an image including all the sound sources, and selects one sound source in the image as a target sound source according to the selection command. The image processing device 3 calculates the relative position between the target sound source and the microphone array 2. The audio processing device 4 performs audio processing to the audio received by the microphone array 2 according to the relative position. Therefore, the target sound source and the noise are accurately identified, the clarity of the target sound source is improved, and the volume of the noise is reduced. Consequently, the communication quality can be ensured.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An audiovisual communication system, comprising:
a plurality of environment sound sources, wherein each of the plurality of environment sound sources has an environment sound;
a microphone array comprising a plurality of microphones, wherein the plurality of microphones receive the plurality of environment sounds and output a plurality of receiving audio signals according to the plurality of environment sounds respectively;
an image processor, wherein the image processor obtains an image comprising the plurality of environment sound sources and utilizes a selection command to select one of the plurality of environment sound sources in the image as a target sound source, and the image processor calculates a relative position between the target sound source and the microphone array according to a first coordinate between the microphone array and the image processor;
an audio processor connected to the image processor and the microphone array, wherein the audio processor receives the plurality of receiving audio signals and the relative position and calculates a target audio signal according to the plurality of receiving audio signals and the relative position; and
a denoise processor, wherein the denoise processor is connected to the audio processor and is configured for receiving the target audio signal and outputting an output sound,
wherein the image processor comprises a depth image algorithm, the depth image algorithm performs depth image calculation on the plurality of environment sound sources in the image to obtain a target depth between the targert sound source and the image processor, and the image processor utilizes the first coordinate and the target depth to correct and obtain the relative position between the target sound source and the microphone array,
wherein the relative position comprises a depth and an angle between the target sound source and each microphone in the microphone array.

2. The audiovisual communication system according to claim 1, wherein the audio processor overlays or cancels the plurality of receiving audio signals by each other according to the plurality of depths and angles, and the audio processor outputs the target audio signal.

3. The audiovisual communication system according to claim 1, wherein the audio processor receives the plurality of receiving audio signals and the relative position and calculates a noise audio signal according to the plurality of receiving audio signals and the relative position, and the denoise processor receives the target audio signal and the noise audio signal and outputs the output sound according to the target audio signal and the noise audio signal.

4. The audiovisual communication system according to claim 1, wherein the image processor comprises a feature extraction algorithm, the image processor utilizes the feature extraction algorithm to perform feature extraction on the plurality of environment sound sources in the image and creates a corresponding label for each environment sound source to distinguish different faces according to the result of feature extraction, and the image processor selects one of the labels as the target sound source by the selection command.

5. The audiovisual communication system according to claim 4, wherein the image processor receives a tracking command and tracks a movement of the target sound source according to the tracking command, and the image processor continually updates the relative position between the target sound source and the microphone array according to the movement of the target sound source.

6. The audiovisual communication system according to claim 1, further comprising a voice recognition device, connected to the denoise processor, wherein the voice recognition device is configured for receiving the output sound and outputting a plurality of word strings in real time according to the output sound.

7. The audiovisual communication system according to claim 1, wherein the first coordinate between the image processor and the microphone array is a preset value, and the image processor of calculates the relative position between the target sound source and the microphone array according to the first coordinate.

8. A control method of an audiovisual communication system, the control method comprising steps of:
(a) utilizing a plurality of microphones of a microphone array to receive a plurality of environment sounds and to output a plurality of receiving audio signals according to the plurality of environment sounds respectively;

(b) providing a first coordinate between an image processor and the microphone array;
(c) utilizing the image processor to obtain an image comprising a plurality of environmental sound sources;
(d) utilizing a selection command to select one of the plurality of environment sound sources as a target sound source;
(e) utilizing the image processor to calculate a relative position between the target sound source and the microphone array according to the first coordinate;
(f) utilizing an audio processor to receive the plurality of receiving audio signals and the relative position and to calculate a target audio signal according to the plurality of receiving audio signals and the relative position; and
(g) utilizing a denoise processor to receive the target audio signal and to output an output sound,
wherein the image processor comprises a depth image algorithm, the depth image algorithm performs depth image calculation on the plurality of environment sound sources in the image to obtain a target depth between the targert sound source and the image processor, and the image processor utilizes the first coordinate and the target depth to correct and obtain the relative position between the target sound source and the microphone array,
wherein the relative position comprises a depth and an angle between the target sound source and each microphone in the microphone array.

9. The control method according to claim 8, wherein the step (f) further comprises a step of:
(f1) utilizing the audio processor to receive the plurality of receiving audio signals and the relative position and to calculate a noise audio signal according to the plurality of receiving audio signals and the relative position,
wherein the step (g) further comprises a step of:
(g1) utilizing the denoise processor to receive the target audio signal and the noise audio signal and to output the output sound according to the target audio signal and the noise audio signal.

10. The control method according to claim 8, further comprising steps of:
(h) tracking a movement of the target sound source when receiving the tracking command; and
(i) updating the relative position between the target sound source and the microphone array according to the movement of the target sound source, and performing the step (f) again after the step (i) is performed.

* * * * *